R. A. SMITH AND J. J. SERRELL.
FLEXIBLE COUPLING.
APPLICATION FILED FEB. 7, 1920.
1,403,271.
Patented Jan. 10, 1922.
2 SHEETS—SHEET 1.
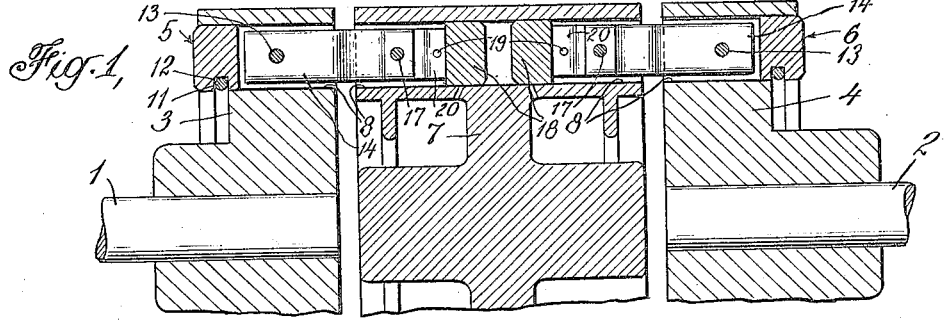
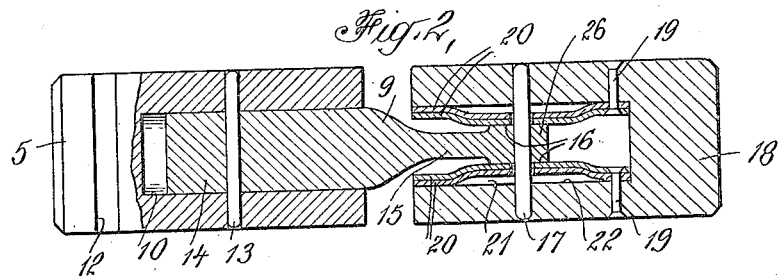
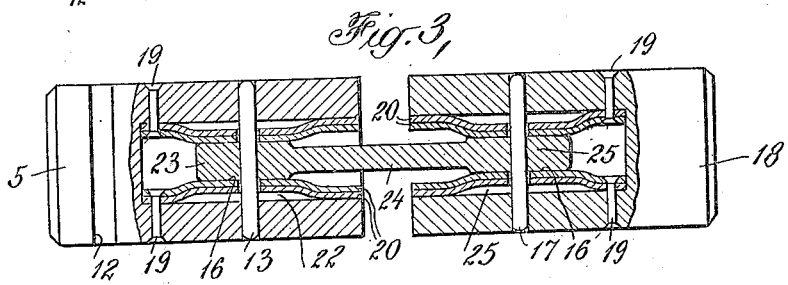
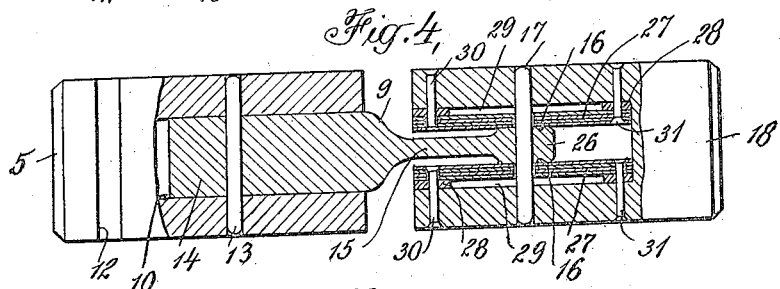
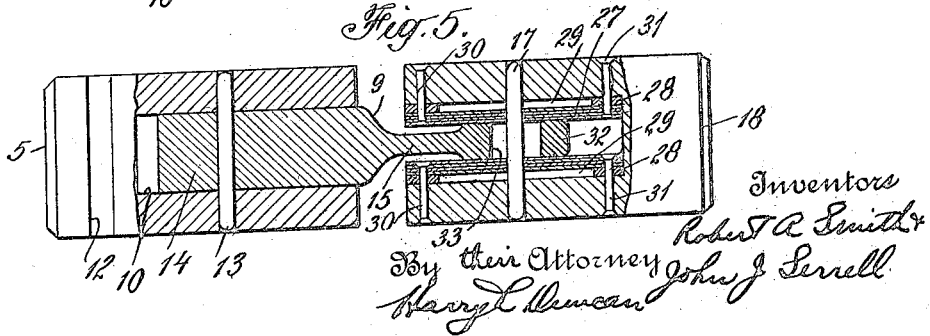
Inventors
Robert A. Smith &
John J. Serrell
By their Attorney
Harry L. Duncan

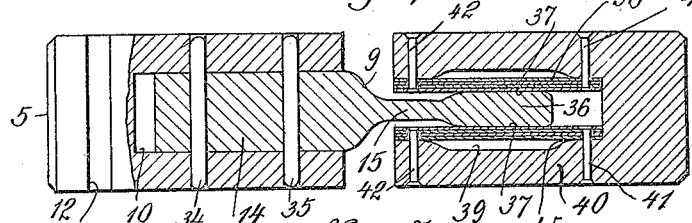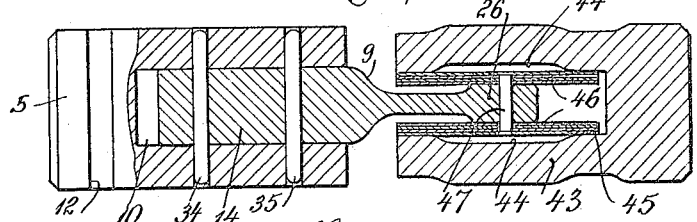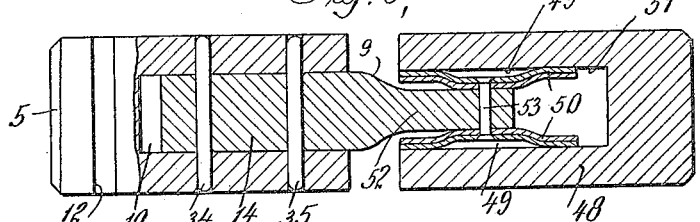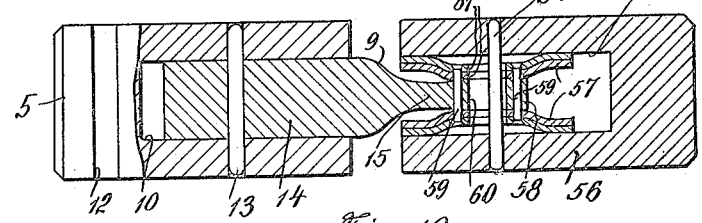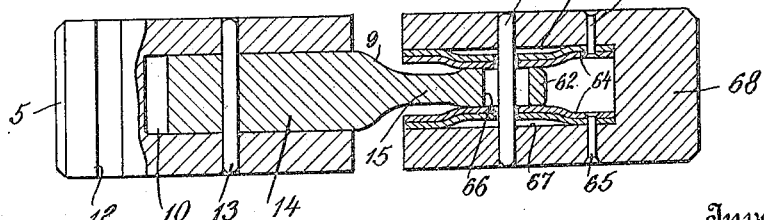

UNITED STATES PATENT OFFICE.

ROBERT A. SMITH, OF MAHWAH, AND JOHN J. SERRELL, OF ELIZABETH, NEW JERSEY, ASSIGNORS TO SMITH & SERRELL, OF MAHWAH, NEW JERSEY, A COPARTNERSHIP CONSISTING OF SAID SMITH AND SAID SERRELL.

FLEXIBLE COUPLING.

1,403,271.  Specification of Letters Patent.  Patented Jan. 10, 1922.

Application filed February 7, 1920. Serial No. 356,979.

*To all whom it may concern:*

Be it known that we, ROBERT A. SMITH, of Mahwah, Bergen County, State of New Jersey, and JOHN J. SERRELL, of Elizabeth, Union County, State of New Jersey, citizens of the United States, have made a new and useful Invention Relating to Flexible Couplings, of which the following is a specification, taken in connection with the accompanying drawing, which forms part of the same.

This invention relates especially to flexible couplings for connecting shafts or other rotary members so as to compensate for the usual slight lack of concentric and angular alignment of the two members and also preferably allow a considerable degree of resilient or cushioning action between them while minimizing undesirable localized pressure and wear between the resilient and other contacting coupling elements. For this purpose the cooperating coupling members, which may comprise an interposed floating ring coupling member in some cases, may be formed with a series of circumferentially spaced or other holes or recesses to accommodate coupling pins or elements located in these holes and extending between adjacent coupling members. These coupling pins or elements may comprise a connector preferably of suitably resilient character which may be united to or formed integral with the keeper or pin end forming one end of the coupling element and in some cases preferably has a loose or swivelling connection therewith, while the projecting reduced area connector head which may be provided on the connector may form a definitely located equalizing bearing portion cooperating with the keeper or pin end at the other end of the coupling element and preferably having resilient contact therewith as by interposed contact springs connected to either one of these cooperating parts on one or both sides of the connector head. In this way the connector may have a relatively loose or flexible equalizing bearing upon the cooperating portion of the keeper or pin end so that undesirable wear is minimized, since the working pressure is substantially normal between these parts and objectionable end thrust may be practically eliminated between these members which may be pivotally or otherwise loosely connected, if desired.

In the accompanying drawing showing in a somewhat diagrammatic way a number of illustrative embodiments of this invention.

Fig. 1 is a longitudinal section through cooperating coupling members and the coupling pins or elements which may be used in connection therewith; and Figs. 2 to 10 are enlarged sectional views of various forms of coupling pins or elements taken substantially at right angles to the plane of the coupling pins shown in Fig. 1.

The cooperating coupling members which may flexibly and resiliently connect two rotary members, such as the shafts 1, 2, may comprise the flanged coupling members 3, 4, and also in some cases an interposed floating ring coupling member 7, these coupling members being formed with any suitable cooperating or aligned holes or recesses, such as the recesses 8 which may, if desired, be circumferentially spaced around their peripheries and formed substantially parallel to the axes of the coupling members so as to accommodate suitable coupling pins or elements bridging the gaps between these coupling members and operatively connecting them while allowing the desired slight play and also resilient yield, if desired, under operating conditions. As shown in Fig. 1 the coupling elements may have the pin ends or keepers 5 held in position in the recesses in the coupling member 3 by suitable retaining spring or ring member 11 which may engage the notches or depressions 12 in these pin ends, so that each of these coupling pins or elements is retained in proper position with respect to the coupling member. The other keepers or pin ends 18 of these coupling elements may be slidably arranged within the recesses 8 in the interposed floating ring coupling member where this is used or in the corresponding recesses in the opposing flanged coupling member 4, for example, where the interposed floating ring is not employed. In the double type of coupling shown in Fig. 1, another series of similar coupling pins or elements 6 may as indicated be secured to the flange coupling member 4 and have their free ends or keepers 18 slidingly mounted in the recesses 8 in the interposed coupling member 7. These coupling pins or elements may have the construction indicated in Fig. 2 in which the pin end or keeper 5 may, for example, be formed of one piece of round or suitable sectioned metal and provided with a socket 10 in which the end of the metallic connector 14 of spring steel or other suitable material is accommodated and preferably swivellingly mounted as by the securing pivot 13. The bridging part 9 of this connector may merge into a reduced neck 15 entering the pin end or keeper 18 on the other end of the coupling element and preferably formed with a connector head 26 so as to provide relatively short bearing portions between this connector and the cooperating portions of the keeper or coupling element. It is usually desirable to interpose on one or both sides of the connector head suitable cushioning members or contact springs, such, for example, as the bridging contact springs 20 which may be formed of several thicknesses of spring steel strip and which may advantageously have their central portions out of contact with the adjacent face of the socket 22 in this keeper, so that ample degree of resilient yield may be provided corresponding to the free space 21 at the middle of these bridging springs. This may be effected by bending or bowing up these contact springs into the bridging form shown in which they engage the socket adjacent their end portions while their midportions 16 are thus resiliently forced into engagement with the connector head to form reduced area contact portions so that under operating conditions substantially normal pressure is exerted between these parts and undesirable bending strains correspondingly minimized so that there is a minimum amount of objectionable end thrust between these parts. If desired, especially in connection with double type couplings such as shown in Fig. 1, these contact springs may be secured to the keeper or pin end as by the connecting pivot 17 which may pass through the connector head and springs and through the cooperating keeper to somewhat loosely connect these parts, the holes in the springs and head being such as to allow some slight freedom of movement while the springs are prevented from swinging around the pivot to an undesirable extent as by engagement between their ends and the hole or recess in which the coupling element is mounted. If desired also the spring ends may substantially engage the end of the socket 22 in the keeper and one or more anchor pins or rivets 19 may engage either end of the contact springs and securely unite them to the cooperating keeper.

Some of the types of coupling pins described herein may in some cases have connectors which are resiliently mounted in each of the keepers or pin ends and one form of this type of construction is indicated in Fig. 3 in which the connector 24 of steel or the like may be formed with two relatively flat heads 23, 25 arranged between similarly bridging contact springs 20 which may be secured to the pin ends or keepers 5 and 18 by the anchor pins or rivets 19 while the pivots 13, 17 hold the connector in place in these keepers while allowing the desired amount of swivelling movement between these parts. In this case of course the relatively flat heads of the connector are sufficiently long to give the desired yielding engagement with the contact springs so that a considerably greater degree of cushioning action is thus secured. Of course the connector, if it assumes a somewhat inclined position naturally exerts a somewhat greater degree of end thrust than in the types of coupling element in which the connector is rigidly or swivellingly mounted in one of the pin ends so that it cannot assume such an inclined position where wedging action tends to occur, although any such end thrust is not transmitted except by friction to the coupling members because the interposed cushioning springs in turn have only normal contact pressure with the engaging keepers or pin ends.

Fig. 4 shows a type of coupling pin or element generally similar to the Fig. 2 form and in which the connector 14 is swivellingly mounted in the socket 10 in the keeper or pin end 5 as by the securing pivot 13 so that the connector thus has swivelling movement with respect to the keeper and can swing through a slight angle at least in a plane passing through the axis of the coupling member in which it is mounted. The reduced neck 15 of this connector may be formed with the relatively small area head 26 which as indicated may be resiliently engaged by the contact springs 27 throughout the reduced area contact portions 16 and may be formed of any desired number of layers of thin tempered spring steel and be mounted on supporting blocks, such as 28, in the socket 29 in this keeper so as to have a sufficient bridging action at their central portions to allow the desired range of cushioning action in each of the coupling pins or elements. These contact springs and the supporting blocks also, if desired, may be secured to the keeper by anchor pins or rivets 30, 31, one of which may have in each case sufficient looseness or play with respect to the springs to allow their normal flexure and for this reason the holes in the springs through which the connecting pivot 17 passes may be similarly enlarged. This connecting pivot is desirable to loosely connect the head of the connector to the keeper where the coupling pin is used in a double type of coupling with an interposed floating ring coupling member, as shown in Fig. 1.

In a single type of coupling where the two rotary coupling members directly cooperate without any interposed floating ring coupling member between them it is desirable in some cases to have a considerably greater freedom of movement between the connector and one of the keepers and for this purpose the connector head may have a loose or pin and slot connection with one of the keepers so that the necessary end play can occur at this point and thus, if desired, minimize the end play which is necessary between the keeper and the coupling member in which it is mounted. Fig. 5 shows such a type of coupling pin in which the connector 14 may be swivellingly mounted in a socket 10 in one of the keepers or pin ends 5 while the head 32 which may be formed on the thin or reduced portion 15 of this connector may have a pin and slot connection with the keeper in which it is mounted as by forming the slot 33 in this head through which the connecting pivot 17 loosely passes. The reduced area or contact portion of this head effects a correspondingly localized contact with the keeper or pin end or with the contact springs which may be interposed between these parts on one or both sides of the head. As indicated in Fig. 5 multiple layer contact springs 27 may be arranged on one or both sides of this connector head and may be secured within the socket 29 in the keeper by suitable anchoring pins or rivets 30, 31 which may simultaneously secure supporting blocks 28 in position so that the springs have the desired bridging action as in the former cases.

In some cases the connector head may be allowed to slide freely within the socket of the keeper with which it cooperates and this is shown in Fig. 6 in which the head 36 of the connector has a relatively localized contact with the bearing portion 37 of the contact springs 38 which may be mounted within the socket 39 in the keeper 40 by suitable anchor pins or rivets 41, 42. This keeper may be formed adjacent the ends of the socket with integral supporting portions or blocks 45 so that the contact springs have the desired bridging action and sufficient resilient yield can thus take place, sufficient clearance being of course provided between the springs and one of these sets of anchor pins for this purpose. A connector of this type may be swivellingly or rigidly mounted within the socket of one of the keepers with which it cooperates and as shown in Fig. 6 the supporting end 14 of this connector may fit fairly closely within the socket 10 in the keeper 5 and be secured thereto by a securing pivot or pin, such as 34, passing through any suitable parts of these members so as to allow swivelling movement between them. In some cases, however, where the connector head is arranged to move freely within the socket of the cooperating keeper the supporting end of the connector may be rigidly mounted in this keeper as by the use of two securing pins 34, 35, which prevent substantially all movement between these parts. Fig. 7 shows another construction in which, if desired, the supporting end 14 of the connector may be similarly rigidly secured to the keeper 5 while the head 26 of this connector may be secured to one or more sets of contact springs 46 as by the pin or rivet 47. These contact springs may as indicated be freely or slidingly supported within the socket 44 in the keeper 43 which is preferably formed with integral supporting portions or contact blocks 45 to cooperate with the ends of these springs 46 under operating conditions. The contact springs thus always have a bridging action and have localized central engagement with the connector head 26 which, if desired, may be sufficiently loosely connected to the springs to prevent undesirable bending strains and resultant end thrust. Fig. 8 shows another form of construction in which the connector is formed with a somewhat reduced neck or end portion 52 to which the arched up or bridging contact springs 50 may be secured as by the somewhat loose pivot or rivet connection 53. The end portions of these contact springs thus engage the socket 51 in the keeper or pin end 48 while ample space 49 for the desired cushioning yield of the parts is provided adjacent the central portions of these springs which may move endwise and also laterally to some extent within the socket under operating conditions. In all these types of coupling pins referred to in this paragraph the supporting end 14 of the connector may be substantially rigidly secured to the keeper 5 in which it is mounted or by omitting one of these supporting pins or pivots 35 a definite swivelling or pivotal connection may be secured, since the remaining pivot, such as 34, would then swivellingly mount the connector within the socket 10 in the keeper so that the desired swivelling action would take place between these parts, limited, of course to the amount of lateral movement which is provided between the other or free end of the connector and the hole in which the keeper is mounted or the other parts cooperating with this reduced end of the connector.

Fig. 9 shows another construction which is likewise particularly adapted for use in a single or two-part coupling, where no interposed floating ring coupling member is employed. In this case the connector 14 may be pivotally or swivellingly mounted in the socket 10 in the keeper 5 by employing a supporting pivot 13 and this connector may have a reduced neck and head 58 which may be secured on one or both sides thereof to contact springs such as 57 arranged within the socket 55 in the keeper or pin end 56. For this purpose rivets or pins 59 may pass through the head and springs which may also be formed with a slot or aperture 60 corresponding to slots 61 in the springs through which a connecting pivot or pin 54 may pass to provide a loose pin and slot connection between these parts. In this way ample end play may be provided between the free end or head of the connector and the keeper in which it is mounted, while at the same time undesirable lateral movement may be minimized or prevented.

Fig. 10 shows a construction in which the head 62 of the connector is formed with a slot 66 through which a connecting pivot 63 passes to provide a loose pin and slot connection between these parts, the contact spring 64 in this case being, however, secured or connected to the keeper 68 as by the anchor pins or rivets 65 so as to still further ensure the normal engagement between these parts and corresponding elimination of undesirable end thrust under operating conditions of the coupling. These contact springs may as indicated be of the arched up or bridging form so that at their central portions ample yield is secured before the springs are flattened out to give any substantial central engagement with the sides of the socket 67 in which they are arranged. Of course in this as in other types described any desired number of layers of such tempered spring strips may be used on one or both sides of the connector head, although in order to make the coupling pin completely interchangeable it is usually desirable to have contact or cushioning springs on both sides of the head where additional cushioning action is desirable in the operation of the coupling beyond what can be secured by the yielding or bending of the relatively thin neck or end of the connector which may of course be formed of spring steel or other resilient material for this purpose.

This invention has been described in connection with a number of illustrative embodiments, forms, proportions, parts, shapes, materials, arrangements, methods of manufacture and use, to the details of which disclosure the invention is not of course to be limited, since what is claimed as new and what is desired to be secured by Letters Patent is set forth in the appended claims:

1. In yieldable flexible couplings, flanged coupling members adapted to be connected to shafts, an interposed cooperating floating ring coupling member, there being a series of circumferentially spaced cooperating cylindrical holes in said coupling members, and coupling pins arranged in said holes to give flexible and resilient yielding connection between said coupling members, said coupling pins each comprising integral keepers formed with sockets, an integral connector having a supporting end swivellingly mounted in the socket in one of said keepers and having a relatively thin neck and reduced area connector head on the free end of said connector and normally operating within the socket in the other keeper, multiple layer bridging contact springs arranged on both sides of said connector head within said keeper socket to have reduced area contact substantially normal to said connector head and minimize end thrust, a connecting pivot passing through said connector head and said contact springs and the cooperating keeper to loosely connect the same, and anchor pins riveted to said contact springs and the cooperating keeper to hold one end of each of said springs in substantial position within said keeper.

2. In yieldable flexible couplings, coupling members adapted to be connected to shafts, an interposed cooperating floating ring coupling member, there being a series of holes in said coupling members, and coupling pins arranged in said holes to give flexible and resilient yielding connection between said coupling members, said coupling pins each comprising integral keepers formed with sockets, an integral connector having a supporting end mounted in one of said keepers and having a reduced area connector head on the free end of said connector and normally operating within the socket in the other keeper, multiple layer bridging contact springs arranged on both sides of said connector head within said keeper socket to have reduced area contact substantially normal to said connector head and minimize end thrust, and anchor pins riveted to said contact springs and the cooperating keeper to hold one end of each of said springs in substantial position within said keeper.

3. In yieldable flexible couplings, coupling members, there being a series of holes in said coupling members, and coupling pins arranged in said holes to give flexible and resilient yielding connection between said coupling members, said coupling pins each comprising integral keepers formed with sockets, an integral connector having a supporting end mounted in one of said keepers and having a reduced area connector head on the free end of said connector and normally operating within the socket in the other keeper, and contact springs arranged on both sides of said connector head within said keeper socket to have reduced area contact substantially normal to said connector head and minimize end thrust.

4. In yieldable flexible couplings, coupling members, there being a series of cooperating cylindrical holes in said coupling members, and coupling pins arranged in said holes to give flexible and resilient yielding connection between said coupling members, said coupling pins each comprising keepers, an integral connector having a supporting end swivellingly mounted in one of said keepers and having a reduced area connector head on the free end of said connector and normally operating within the other keeper, bridging contact springs cooperating with said connector head within said keeper.

5. In yieldable flexible couplings, coupling members, there being a series of cooperating holes in said coupling members, and coupling pins arranged in said holes to give flexible and resilient yielding connection between said coupling members, said coupling pins each comprising keepers, a connector having a supporting end mounted in one of said keepers and having a reduced area free end normally operating within the other keeper, bridging contact springs cooperating with said connector head within said keeper.

6. In yieldable or flexible couplings, coupling pins adapted to removably cooperate with recesses in coupling members and each comprising integral cylindrical keepers formed with sockets, an integral connector having a supporting end swivellingly mounted in the socket in one of said keepers and having a reduced area connector head on the free end of said connector and normally operating within the socket of the other keeper, multiple layer contact springs arranged on both sides of said connector head within said cooperating keeper socket to have reduced area contact substantially normal to said connector head and minimize end thrust, and a connecting device loosely connecting said connector head and said contact springs and the cooperating keeper to loosely connect the same.

7. In yieldable or flexible couplings, coupling pins adapted to removably cooperate with recesses in coupling members and each comprising keepers formed with sockets, a connector mounted in the socket in one of said keepers and having a reduced area connector head on the free end of said connector and normally operating within the socket of the other keeper, multiple layer contact springs arranged on both sides of said connector head within said cooperating keeper socket, and a connecting device connecting said connector head and said contact springs and the cooperating keeper to loosely connect the same.

8. In yieldable or flexible couplings, coupling pins adapted to removably cooperate with recesses in coupling members and each comprising keepers formed with sockets, a connector mounted in the socket in one of said keepers and having a reduced area connector head on the free end of said connector and normally operating within the socket of the other keeper and contact springs cooperating with said connector head within said cooperating keeper socket, and a connecting device connecting said connector head and said contact springs and the cooperating keeper to loosely connect the same.

9. In yieldable flexible couplings, coupling pins adapted to removably cooperate with recesses in coupling members and each comprising keepers, an integral connector having a supporting end swivellingly connected to one of said keepers and having a reduced area connector head on the free end of said connector and normally operating within the other keeper, multiple layer bridging contact springs arranged on both sides of said connector head within said cooperating keeper to have reduced area contact substantially normal to said connector head and minimize end thrust and a connecting pivot passing through said connector head and said contact springs and the cooperating keeper to loosely connect the same.

10. In yieldable flexible couplings, coupling pins adapted to removably cooperate with recesses in coupling members and each comprising keepers, a connector having a supporting end connected to one of said keepers and having a reduced area connector head on the free end of said connector and normally operating within the other keeper, bridging contact springs arranged on both sides of said connector head within said cooperating keeper to have reduced area contact substantially normal to said connector head.

11. In flexible couplings, coupling pins adapted to removably cooperate with recesses in coupling members and each comprising keepers, a connector having a supporting end swivellingly connected to one of said keepers and having a reduced area connector head on the free end of said connector and normally operating within the other keeper, multiple layer bridging contact springs cooperating with said connector head within said cooperating keeper, and a connecting member securing together said connector head and said contact springs and the cooperating keeper while allowing slight angular movement between them.

12. In flexible couplings, coupling pins adapted to removably cooperate with recesses in coupling members and each comprising keepers, a connector having a supporting end swivellingly connected to one of said keepers and having a reduced area connector head on the free end of said connector and normally operating within the other keeper and a bridging contact spring cooperating with said connector head within said cooperating keeper.

13. In flexible couplings, coupling pins adapted to removably cooperate with recesses in coupling members and each comprising a connector having a reduced area connector head on the free end of said connector, a keeper within which the free end of said connector normally operates and bridging contact springs cooperating with said connector head within said cooperating keeper.

14. In flexible couplings, coupling pins adapted to removably cooperate with recesses in coupling members and each comprising a connector having a reduced free end, a keeper within which the free end of said connector normally operates, and a contact spring cooperating with said connector head within said cooperating keeper.

15. In flexible couplings, coupling pins adapted to removably cooperate with recesses in coupling members and each comprising a connector having a reduced area head on its free end, a keeper within which the free end of said connector normally operates and a contact member cooperating with the free end of said connector and located within the cooperating keeper and having its contact surface engaged by said head substantially parallel to the sides of said keeper.

16. In flexible coupling, coupling pins adapted to removably cooperate with recesses in coupling members and each comprising a connector having a reduced area head on its free end, a keeper within which the free end of said connector normally operates and having its contact surface engaged by said head substantially parallel to the sides of said keeper.

17. In flexible couplings, coupling pins adapted to removably cooperate with recesses in coupling members and each comprising a resilient connector having a projecting free end, a keeper within which the free end of said connector normally operates and a contact member cooperating with the free end of said connector and movably mounted within the cooperating keeper and having its contact surface engaged intermediate of the length of said keeper by the free end of said connector substantially parallel to the adjacent side of said keeper.

18. In flexible coupling, coupling pins adapted to removably cooperate with recesses in coupling members and each comprising a connector having a projecting free end, a keeper within which the free end of said connector normally operates and having its contact surface engaged intermediate of the length of said keeper by the free end of said connector substantially parallel to the adjacent side of said keeper.

19. In flexible couplings, flanged coupling members adapted to be connected to shafts and formed with cooperating series of holes and coupling pins in said holes and each comprising a connector having a reduced area head on one end and a cooperating keeper within which the free end of said connector normally operates and a resilient contact member cooperating with the free end of said connector and located within the cooperating keeper and having its contact surface engaged by said head substantially parallel to the adjacent side of said keeper.

20. In flexible couplings, coupling members adapted to be connected to shafts and formed with cooperating series of holes and coupling pins in said holes and each comprising a connector having a reduced area head on one end and a cooperating keeper within which the free end of said connector normally operates and a resilient contact member cooperating with the free end of said connector and located within the cooperating keeper.

21. In flexible couplings, coupling members adapted to be connected to shafts and formed with cooperating series of holes and coupling pins in said holes and each comprising a connector having a small area free end and a cooperating keeper within which the free end of said connector normally operates and a contact member cooperating with the free end of said connector and located within the cooperating keeper and having its contact surface engaged by said head substantially parallel to the adjacent side of said keeper.

22. In flexible couplings, coupling members adapted to be connected to shafts and formed with cooperating series of holes and coupling pins in said holes and each comprising a connector having a small area free end and a cooperating keeper within which the free end of said connector normally operates and having its contact surface engaged by said head substantially parallel to the adjacent side of said keeper.

ROBERT A. SMITH.
JOHN J. SERRELL.